United States Patent [19]

Clark et al.

[11] Patent Number: 4,593,476

[45] Date of Patent: Jun. 10, 1986

[54] COMPUTER AIDED ADJUSTABLE TUBE CHECKING FIXTURE SYSTEM

[75] Inventors: Kevin E. Clark, Kirkland; Richard P. Jones, Everett, both of Wash.

[73] Assignee: The Boeing Company, Seattle, Wash.

[21] Appl. No.: 747,327

[22] PCT Filed: Sep. 6, 1982

[86] PCT No.: PCT/US83/01354
§ 371 Date: Sep. 6, 1983
§ 102(e) Date: Sep. 6, 1983

[87] PCT Pub. No.: WO85/01102
PCT Pub. Date: Mar. 14, 1985

[51] Int. Cl.⁴ ............................................. G01B 5/20
[52] U.S. Cl. ...................................... 33/529; 33/568; 33/551; 33/553; 33/545
[58] Field of Search ................ 33/568, 573, 529, 551, 33/553, 554, 557, 169 R, 560, 562, 533, 545, 546, 548, 549; 72/367, 369

[56] References Cited

U.S. PATENT DOCUMENTS

| | | | |
|---|---|---|---|
| 2,807,092 | 9/1957 | Jones | 33/534 |
| 3,203,100 | 8/1965 | Hegedus | 33/551 |
| 4,061,005 | 12/1977 | Kawanami et al. | 72/369 |
| 4,122,608 | 10/1978 | Hopf | 33/549 |
| 4,333,240 | 6/1982 | Searcy | 33/534 |

FOREIGN PATENT DOCUMENTS 929510 6/1955 Fed. Rep. of Germany .... 33/169 R

Primary Examiner—Willis Little
Attorney, Agent, or Firm—Nicolaas DeVogel; Bernard Donahue

[57] ABSTRACT

A tube checking system is made up of a template placed on a flat metallic surface, and a series of adjustable holding fixtures places at selected positions along the template. The template has a computer aided layout of a plan view of a formed tube inscribed on a film with selected check points along the layout showing the height and angle of the tubing above the check point. Each holding fixture is adjustable as to height and angle, is indexed to align to the check point, and has a switchable on off magnet in the base to secure the fixture in position.

14 Claims, 9 Drawing Figures

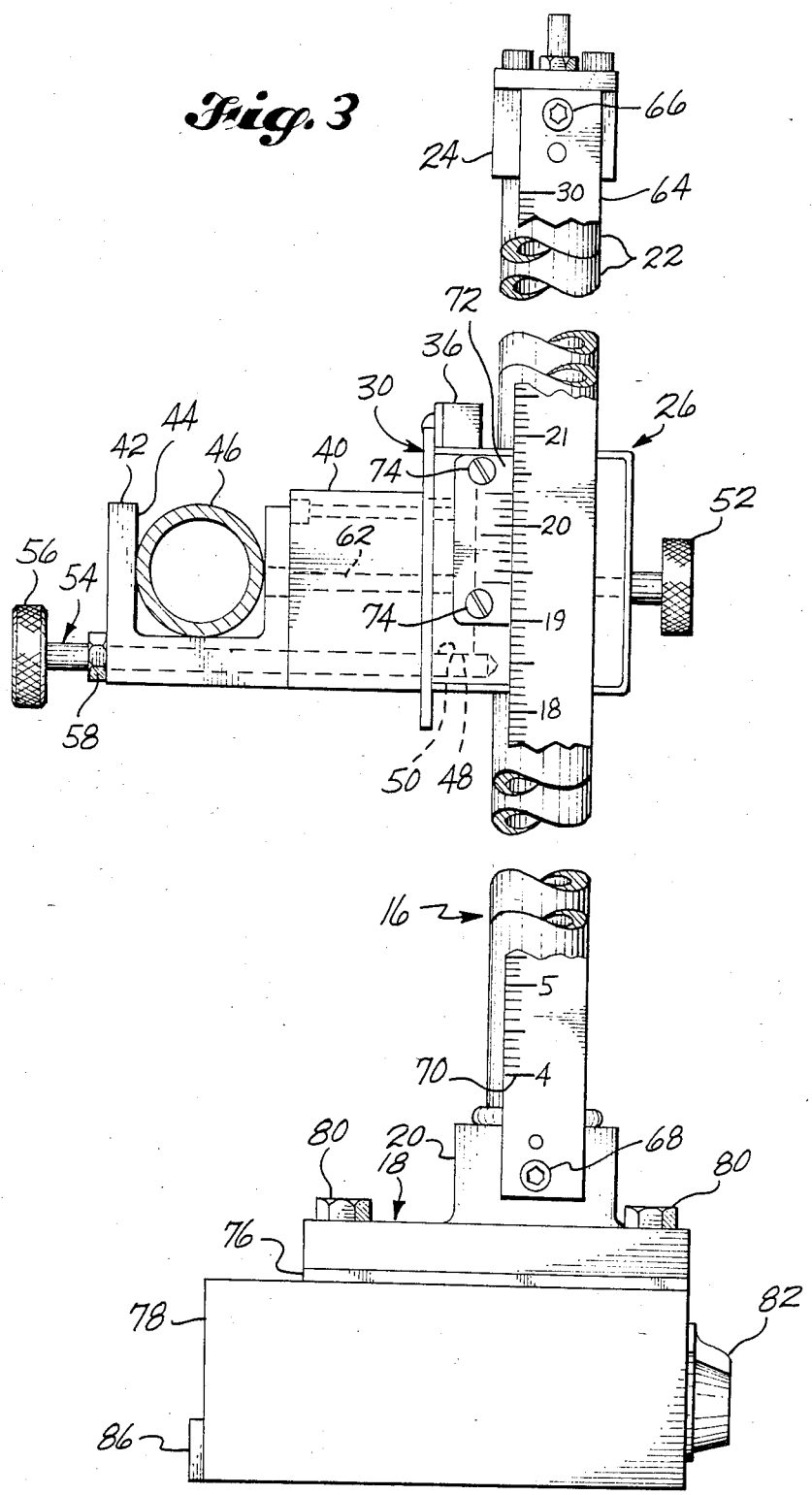

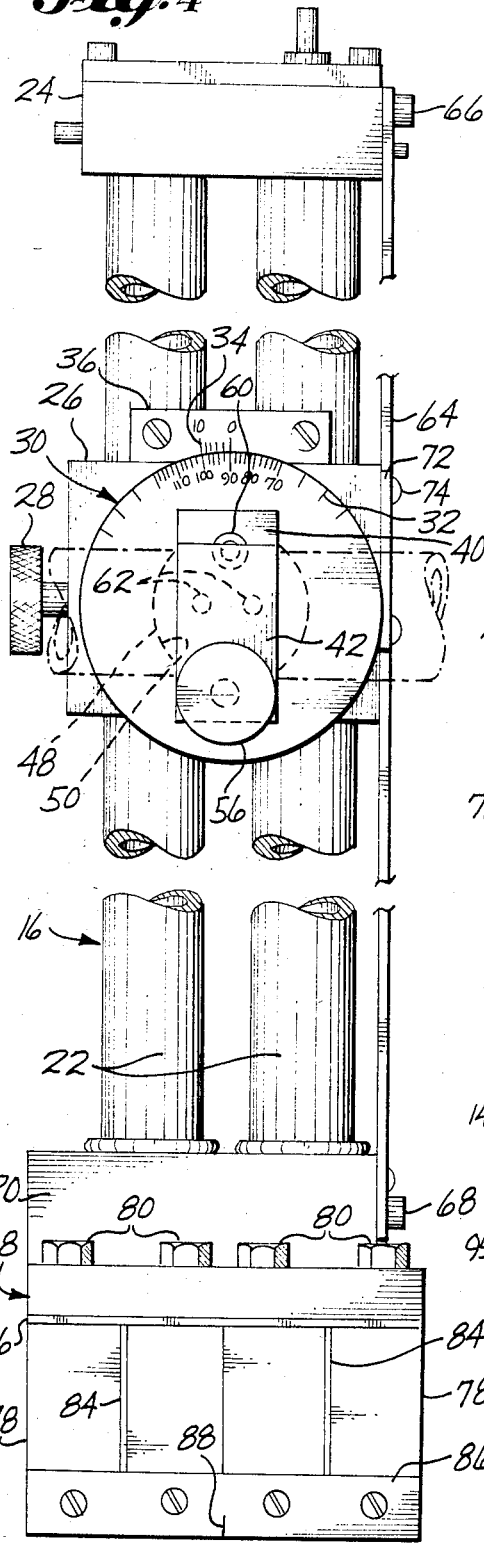
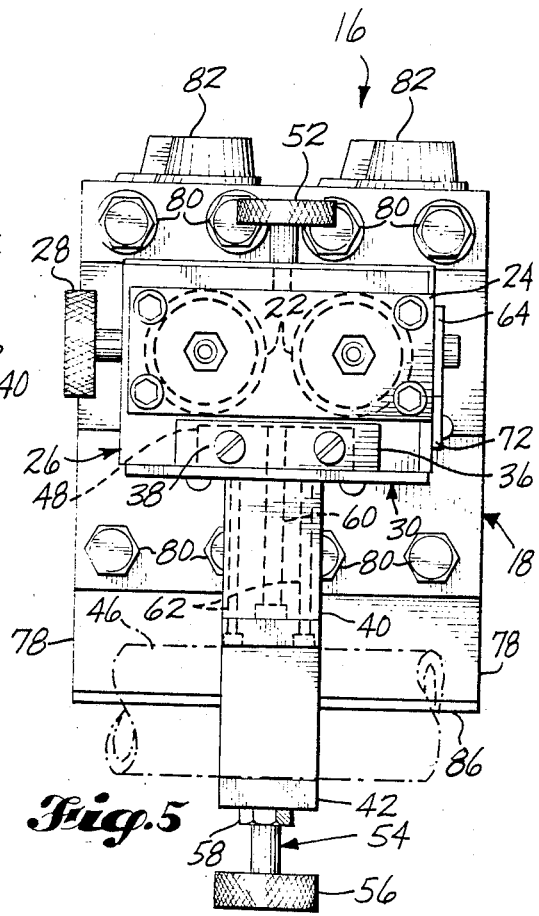
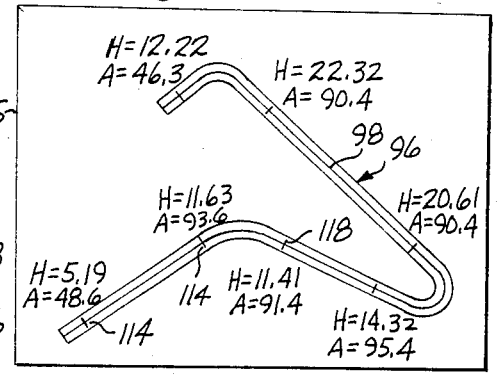

COMPUTER AIDED ADJUSTABLE TUBE CHECKING FIXTURE SYSTEM

BACKGROUND OF THE INVENTION

The checking of intricately bent tubing presents considerable difficulty in the situations where the tolerance is critical. One of the better methods of checking this tubing for production use is to provide permanent hard checking fixtures. These fixtures are very accurate, however, they are expensive to produce and require considerable storage area. Another known method uses a coordinate measuring machine. The accuracy of this depends to some extent upon the flexibility of the formed tube being checked, it requires an experienced operator to get acceptable measurements, and it is time consuming. An accurate inexpensive, easily storable system was found to check tubing and is the subject of this invention.

SUMMARY OF THE INVENTION

Tube checking templates are used in conjunction with adjustable checking fixtures to check formed tubing. A computer aided system is used to determine and to inscribe a plan view of shaped tubing on a film surface along with inscribing checking fixture locations, height and angle of the locations to form a template. The template is placed on a flat metallic surface, the checking fixtures are each set for height and angle, placed at the proper locations, and the formed tubing placed in the fixtures for checking.

It is an object of this invention to provide a simplified tube checking system.

It is another object of this invention to provide a storage efficient tube checking system.

DESCRIPTION OF THE DRAWINGS

FIGS. 3, 4 and 5 respectively show a side elevation, a front elevation, and a plan view of the holding fixture of FIG. 2.

FIG. 9 shows a plan view of the template used in the tube checking system.

DETAILED DESCRIPTION

Figure 1:
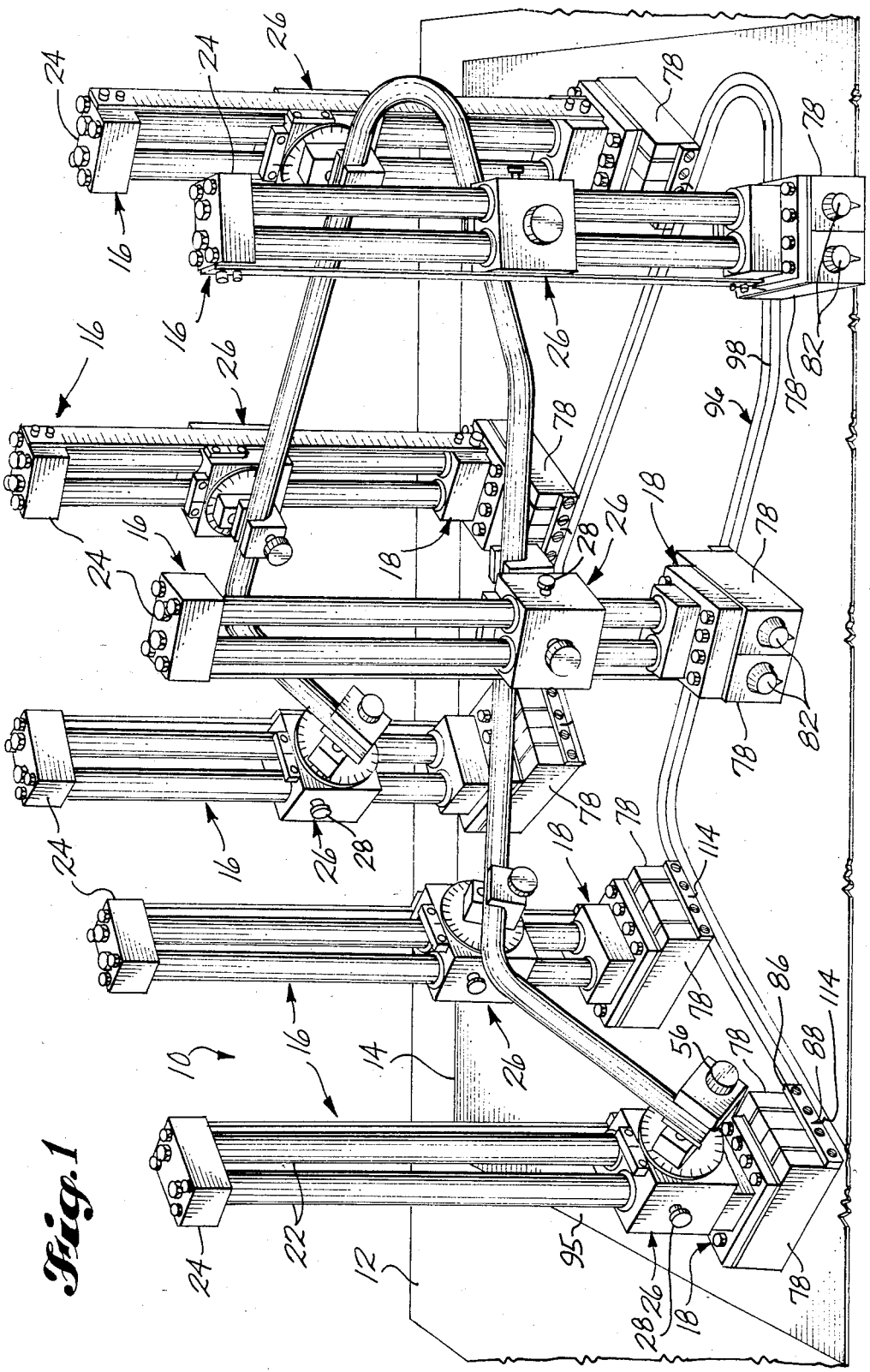
FIG. 1 shows a perspective view of the tube checking system of this invention.
Figure 2:
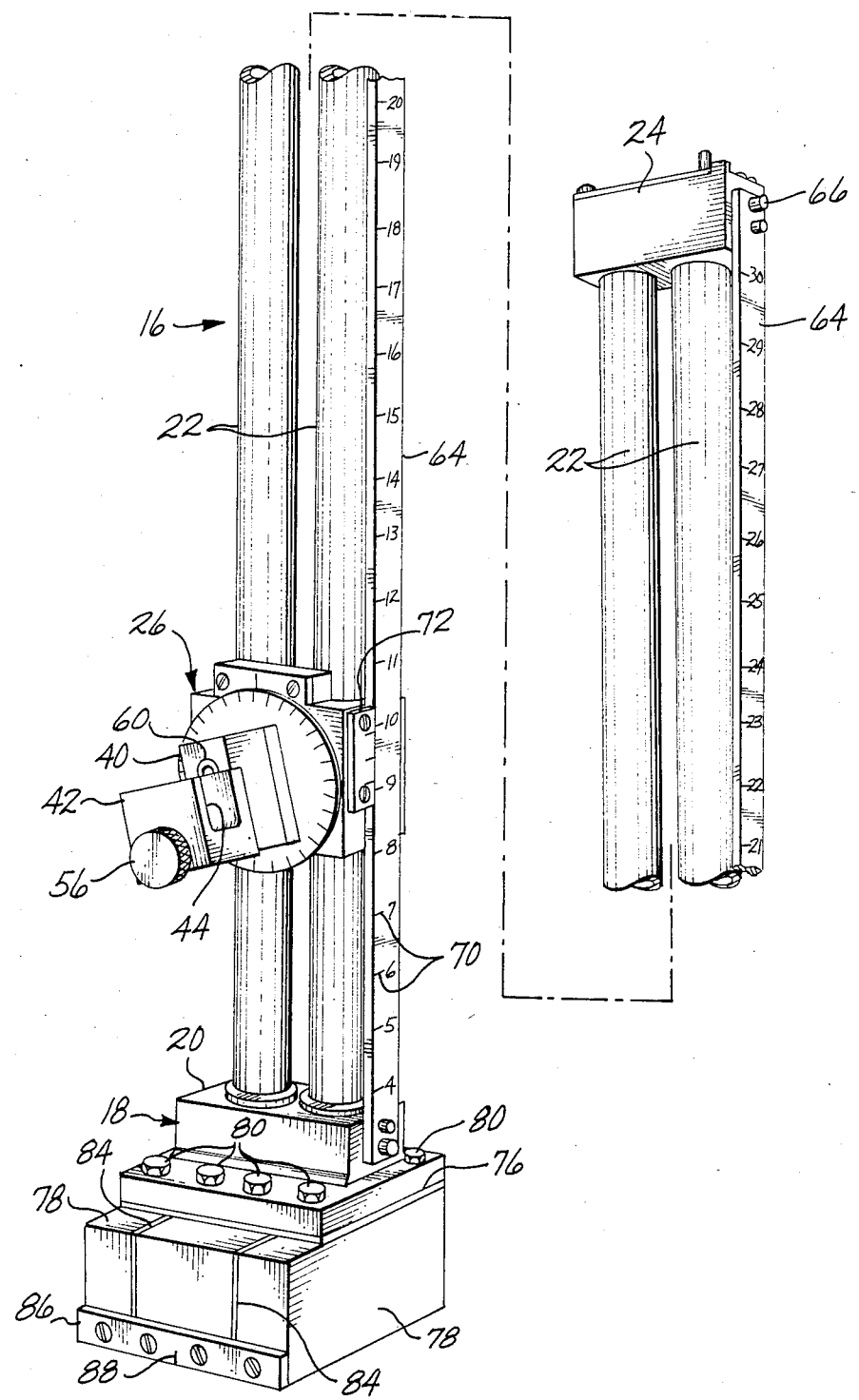
FIG. 2 shows a perspective view of a holding fixture used in this tube checking system.
Figure 8:
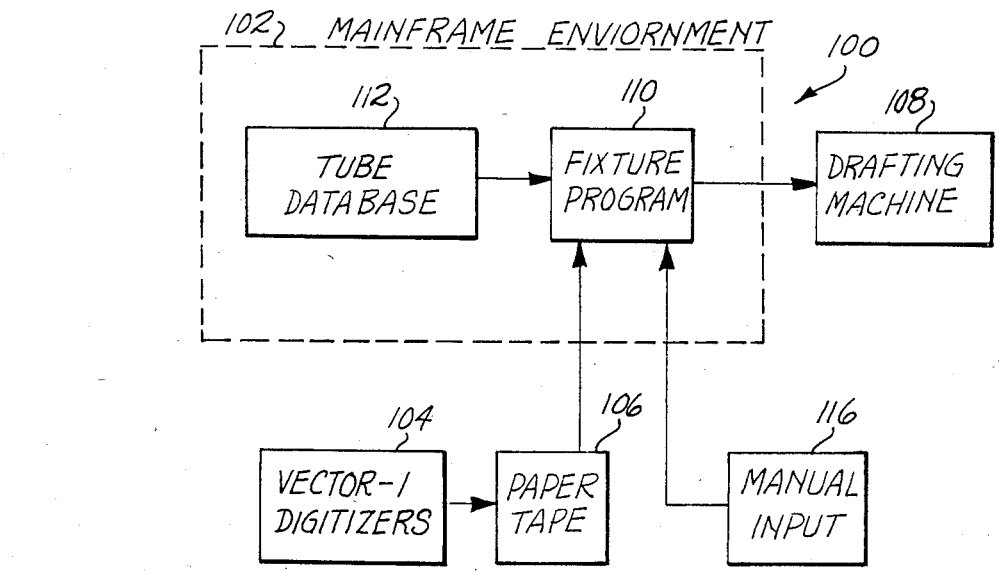
FIG. 8 shows a computer aided schematic for preparing the template used in the tube checking system.

Tube checking system 10, utilizes a flat metallic surface 12, on which is placed a template 14, and series of adjustable holding fixtures 16.

The holding fixture has a base 18, with an upwardly extending offset 20. A pair of parallel upwardly extending tubes 22 are mounted on the offset of the base, and are mounted at their upper end to a cap 24. A head 26, is mounted to slideably move up and down on the tubes. It may be selectively secured at any position along the tubes by use of knob screw assembly 28; which threads into the side of the head and when the knob is tightened secures to one of the tubes. A disc 30, pivotally mounted about its axis to the front of the head has a series of markings 32, extending around its outer face for indicating the angle of rotation of the disc. The angle is read with reference to an angular vernier 34, which is located on a member 36, that is secured by fasteners 38, to the top of the head. An adapter 40, is secured to the face of the disc 30, and a tube holder 42, is secured to the front of the adapter. The tube holder has a U-shaped recess 44, sized to accept and to hold a tube 46, being checked. A cylindrical block 48, as best shown in FIGS. 3 and 4, is shaped and located to rotate freely in a recess 50, located in the head 26. The block is held in position with knobbed bolt 52, which extends in from the back of the head and threads into the block. The bolt and block are then free to rotate. Tightening this bolt locks the block in place. The tube holder, adapter, and the disc are secured together and are joined to the front of the block; so that they all rotate with the block. This is accomplished by use of bolt 54, that has knob 56, for ease of operation. The bolt extends through the tube holder, and is threaded into the adapter. Nut 58 acts as a lock. The adapter is secured to the disc and the block by bolt 60, and the tube holder is secured to the adapter, disc and block by use of dowel pins 62, bolt 54, and nut 58. A bar 64, extends vertically along one side and is joined at the upper end with set screw 66, to the side of the cap 24, and with set screw 68, to the side of the upwardly extending offset 20 of the base 18. The bar has a scale 70, set out in inches to show the vertical distance above the flat surface 12. A vernier 72, is secured with screws 74 to the side of the head 26. This vernier is located alongside the bar 60, and permits accurate positioning of the head.

The base 18, rests on a brass plate 76, and is secured to a pair of magnetic blocks 78, by use of brass bolts 80. Each of the blocks encase a magnet that may be switched with knobs 82, between a vertical and a horizontal position. Each block has a separating vertically directed brass bar 84. When the magnets are directed vertically the vertical brass bars cancel out the effect of the magnets. When the magnets are turned to the horizontal position the magnets are effective, however the brass plate 76, prevents any magnetic effect on the holding fixture above that plate. A brass scribe strip 86, is secured to the front face of the magnetic block with the bottom of the strip along the same plane as the bottom of the magnetic blocks. The strip has a centered and scribed vertical line 88, and the front surface of the strip is directly below and along the centerline of the tube 46, when it is resting in the tube holder 42.

Figure 7:
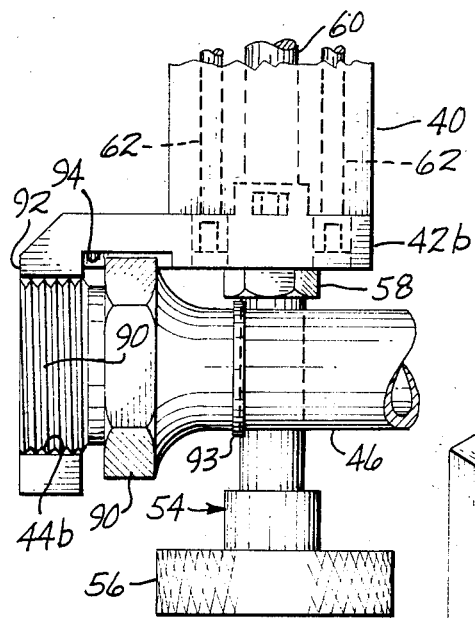
FIG. 7 shows a plan view of the tube holder of FIG. 6.
Figure 6:
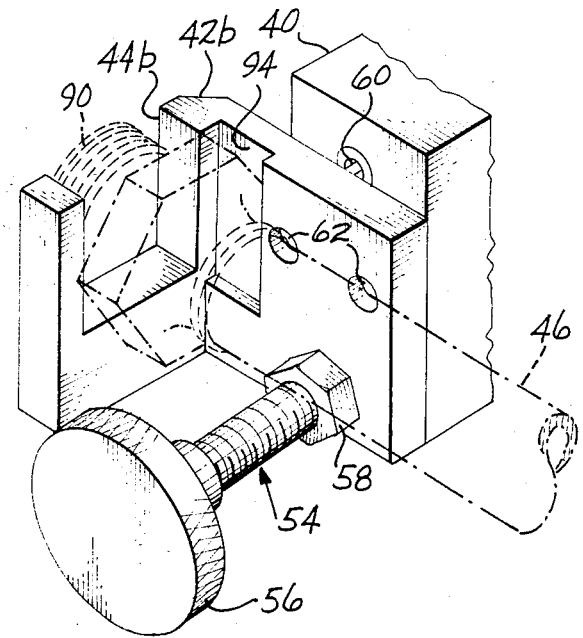
FIG. 6 shows a fragmented perspective view of a different embodiment of a tube holder for the holding fixture.

FIGS. 6 and 7 show a different embodiment of the holding fixture 16. In this embodiment the knobbed bolt 54 is removed; which releases the tube holder 42. An alternate embodiment of a tube holder 42b, is then mounted to the adapter by use of bolt 54. This tube holder is offset to the side, and the U-shaped recess 44b, is sized and located to hold the threaded portion of a fitting 90, even with the end 92, of the tube holder when the fitting is welded at 93, to the end of the tubing 46. The tube holder has a recess 94, to provide clearance to the fitting.

The template 14, utilizes a film 95, which preferably is of mylar. Upon this mylar film, which is preferably about 0.007 inches thick, there is inscribed a plan view 96, of a tube to be checked. This plan view includes an inscription of the centerline 98, of the tubing as well as of the side walls. The inscription is preferably generated by use of a computerized system 100. That system includes a mainframe 102, a vector-1 digitizer 104 and paper tape 106, and a computer operated drafting machine 108. A length of tubing is formed into the required shape. The vector-1 digitizer is then used to measure the shape of the formed tube, and to provide XYZ information between tubing break points, and break points and tubing ends. This information along with bend radius and tube diameter is punched on a paper tape; which in turn feeds the information into the fixture program software 110 part of the mainframe. The fixture program determines the optimum plan view of the formed tube for checking purposes, automatically determines the number of tube checking fixtures required, and their locations on the template. The fixture program software outputs instructions for the computer drafting machine 108; which is used to inscribe the plan view on the mylar film. Data is stored in the tube database 112; for later use. The location position 114, for the adjustable holding fixtures along with the height of the tubing above the flat surface 12, and the angle of the tubing with respect to the location position are also inscribed at each inscribed position for the holding fixture. See FIG. 9. Manual input 116 based on engineering layouts and calculations may be fed into the fixture program to actuate the drafting machine and effect the inscription.

In operation, input as to formed tubing is fed into the computers, and the drafting machine makes a layout of a plan view of the formed tubing on a mylar film. The layout also includes markings 114, of the location for each holding fixture, along with the height and angle for that fixture to form a template 14. The template may be rolled up and stored until ready for use at which time it is unrolled and placed on a flat metallic surface 12. Each holding fixture 16, is then individually adjusted by loosening knob assembly screw 28, and moving the head upward into position and then tightening the knob to lock the head vertically in place. The height is determined by setting the vernier 72, opposite the correct height shown the scale 70, of bar 64. Next knob 52 is loosened, the disc 30 rotated until the desired angle is shown opposite the angular vernier 34, and the knob tightened. Next, each adjustable holding fixture is set on the template with the edge of the scribe strip 86 aligned on the scribed tube centerline 98, and the vertical line 88 placed over the appropriate scribed line 114. The knobs 82, on each holding fixture are then turned to the on position to magnetically lock the holding fixtures in place. The formed tubing is then placed in the fixtures for checking. The checked tubing is removed, and fittings are secured to the ends of the tubing as required. The completed tube assembly with end fittings may then be inspected, if desired, by replacing the tube holders 42; on the end adjustable holding fixtures with a properly aligned tube holder 42b. The completed tube assembly is then placed back in the holding fixtures for checking.

We claim:

1. A system for checking shaped tubing comprising: a film having an inscribed plan view of a formed tube to be checked; a series of adjustable holding fixtures to be positioned on a flat metallic surface holding the inscribed film and each holding fixture having means for alignment with respect to the inscribed line, means for vertical and for angle adjustment for holding a section of formed tubing, and means for locking, each positioned fixture in place on the metallic surface.

2. A system for checking shaped tubing as in claim 1 wherein the inscribed film further comprises a series of inscribed marks along the inscribed line with each mark establishing the location for a holding fixture, and a notation at each location of height and angle setting for the fixture.

3. A system for checking shaped tubing as in claim 1 wherein the means for locking the holding fixture to the metallic surface comprises at least one magnet in the base of the holding fixture.

4. A system for checking shaped tubing as in claim 3 further comprising: the magnet having means for switching between on off position to lock the holding fixture in place and to release the fixture, and means to prevent magnetic forces from entering the upper part of the fixture when the fixture is locked to the metallic surface.

5. A system for checking shaped tubing as in claim 4 further comprising: a series of inscribed marks along the inscribed line with each mark establishing the location for a fixture and a notation at each location of height and angle setting for the fixtures.

6. A system for checking shaped tubing as in claim 5 further comprising: a computer actuated drafting machine, and a computer having means for storing and for converting input information into directions for the computer actuated drafting machine to scribe the lines and the information on the film.

7. A system for checking shaped tubing as in claim 6 further comprising: a machine having means for measuring the shape of a formed tube to provide input information into the computer.

8. A system for checking shaped tubing as in claim 5 further comprising the holding fixture having means for checking a fitting secured to an end of the tubing.

9. A system for checking shaped tubing comprising: a film of material, means for selecting and for inscribing a layout of a plan view of a formed tube on the material, means for selecting and for inscribing check point locations on the layout, means for establishing and for printing on the layout the height and angle setting of the formed tube at each check point to in combination form a template for placement on a flat metallic surface, a series of adjustable holding fixtures for placement and alignment at the check points with each holding fixture having adjustable means for setting height and angle to in combination with the template provide a system for checking a formed tube.

10. A system for checking shaped tubing as in claim 9 wherein the film of material is of mylar.

11. A system of checking shaped tubing as in claim 10 wherein the adjustable holding fixture further comprises an on off adjustable magnet located in the base, and a brass block between the base and the upper part of the holding fixture to prevent magnetic action above the block.

12. A system of checking shaped tubing as in claim 11, with the adjustable holding fixture further comprising means for changing a hoding part of the fixture to check a formed tube with a fitting secured to the end of the tube.

13. A method of checking a formed tube, with steps comprising: preparing a layout of a plan view of a formed tube on a mylar film, marking check points on the layout, entering tube height and angle at each check point, placing the film with layout on a flat metallic surface, aligning an adjustable holding fixture at each check point, setting each fixture for height and angle of the tubing with respect to the flat metallic surface, turning on an adjustment in the base of the holding fixture for using magnetic forces to hold the fixture in position, and checking a formed tube by placing it in the fixtures.

14. A method of checking a formed tube as in claim 13, with further steps comprising: utilizing a special tube holder on the adjustable holding fixture adjacent an end of formed tubing having a fitting secured to the end, and placing the formed tubing with fitting in the fixtures for checking.

* * * * *